United States Patent [19]

Kooiker

[11] Patent Number: 5,005,279

[45] Date of Patent: Apr. 9, 1991

[54] COLLET INSERTION AND REMOVAL DEVICE AND METHOD

[75] Inventor: Mark S. Kooiker, Minnetonka, Minn.

[73] Assignee: Turning, Inc., St. Paul, Minn.

[21] Appl. No.: 525,868

[22] Filed: May 18, 1990

[51] Int. Cl.$^5$ .............................................. B23P 19/00

[52] U.S. Cl. .................................... 29/426.5; 29/243; 29/270; 279/1 ME; 279/46 R; 81/460; 81/176.15

[58] Field of Search .............. 29/243, 240, 270, 426.1, 29/426.5, 428; 81/460, 461, 436, 176.1, 176.15; 279/1 ME, 50, 51, 55, 57, 58, 46 R

[56] References Cited

U.S. PATENT DOCUMENTS

| | | | |
|---|---|---|---|
| 1,158,085 | 10/1915 | Tennyson | 81/436 |
| 2,277,816 | 3/1942 | Brown | 279/1 ME |
| 2,291,795 | 8/1942 | Colt | 294/103 |
| 2,659,256 | 11/1953 | Palmer | 81/176.15 |
| 3,033,254 | 5/1962 | Ericson | 81/460 |
| 3,279,510 | 10/1966 | Dreyer et al. | 81/460 |
| 3,288,184 | 11/1966 | Kyser | 81/460 |
| 4,214,766 | 7/1980 | Rall et al. | 279/46 R |
| 4,237,754 | 12/1980 | Battrick | 81/439 |
| 4,305,193 | 12/1981 | Anderson | 29/213 |
| 4,315,744 | 2/1982 | Albert | 433/126 |
| 4,768,269 | 9/1988 | Williams | 29/225 |
| 4,821,401 | 4/1989 | Williams | 29/568 |

*Primary Examiner*—P. W. Echols
*Assistant Examiner*—David P. Bryant
*Attorney, Agent, or Firm*—Kinney & Lange

[57] ABSTRACT

A device is provided for inserting and removing a collet into and from a collet chuck of a lathe. The collet includes a plurality of fingers which are separated by slots. The device comprises a handle portion and a plurality of blades attached to the handle portion. The plurality of blades are adapted to engage the slots within the collet such that when the handle portion is turned, the collet is threaded into or out of the collet chuck.

8 Claims, 2 Drawing Sheets

COLLET INSERTION AND REMOVAL DEVICE AND METHOD

BACKGROUND OF THE INVENTION

The present invention relates to devices that insert and remove a collet, and in particular, it relates to a tool and method to insert and remove a collet into and from a collet chuck of a lathe.

Collets have exterior chuck engaging surfaces that engage interior compression surfaces of the chuck. In lathe-type machines, a work piece is inserted into a collet which engages the work piece and holds it tightly. The typical collet is provided with a plurality of fingers separated by slots. The work piece is inserted in a work engaging opening defined by the fingers. The fingers are joined such that the fingers tend to be biased outward away from the work engaging opening and towards the interior compression surfaces of the chuck.

Whenever a different sized work piece must be machined, the collet must be changed to accommodate the new structural dimension. This is a relatively common occurrence in some situations because the collets may only have a 0.25" throw. In some machines, it is very difficult to remove the collet from the machine because the chuck must be partially disassembled to release the collet. In addition, it sometimes is difficult to handle a collet because of its smooth surface and lack of areas to easily hold the collet while inserting or removing the collet from the chuck.

Patents that describe collet insertion and removal tools and methods for doing the same include Williams U.S. Pat. No. 4,768,269 and Williams U.S. Pat. No. 4,821,401. The Williams '269 and Williams '401 patents describe a tool with outwardly extending fingers for engaging apertures and gripping the collet. The apertures are formed in the face of each segment of the collet. The collet is gripped by the tool when it is in a compressed condition, so that as it is released by the chuck, the springs of the collet force the collet segments outwardly forcing the side walls of the apertures against the fingers and frictionally locking the collet to the tool.

SUMMARY OF THE INVENTION

The present invention includes a device for inserting and removing a collet into and from a collet chuck of a lathe. The collet includes a plurality of fingers which are separated by slots. The device comprises a handle portion and a plurality of blades attached to the handle portion. The plurality of blades are adapted to engage the slots within the collet such that when the handle portion is turned, the collet is threaded into and out of the collet chuck.

DETAILED DESCRIPTION OF THE PREFERRED EMBODIMENTS

Figure 1:
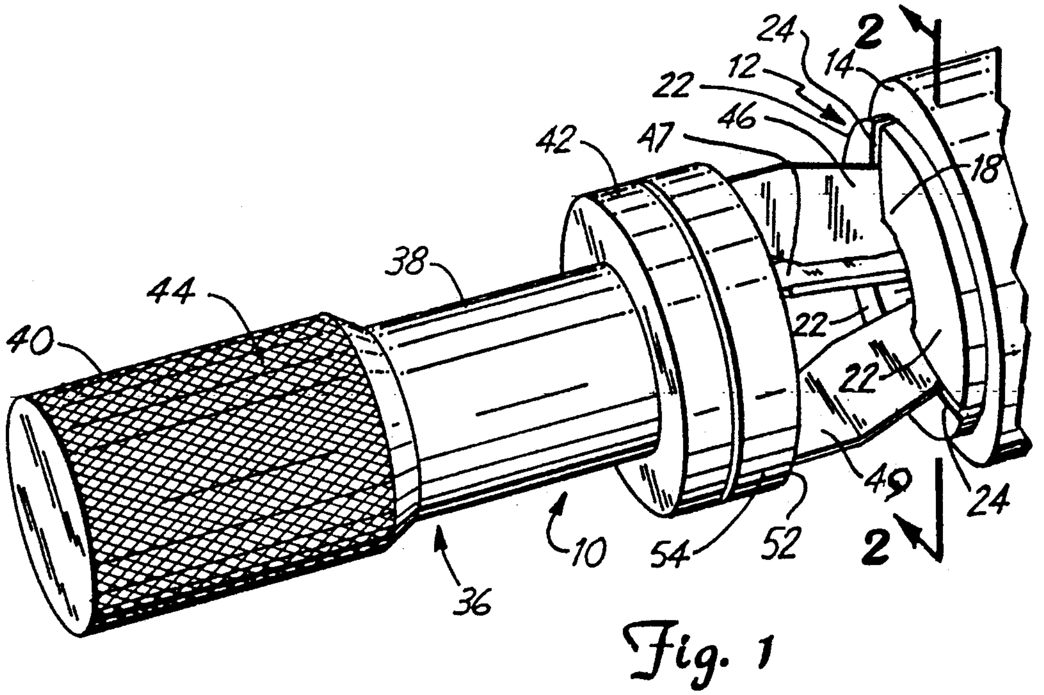
FIG. 1 is a perspective view of the collet insertion and removal device of the present invention.

A tool of the present invention is generally indicated at 10 in FIG. 1. The tool 10 is for use with a collet, designated generally at 12. The tool 10 allows the user to easily and quickly insert and remove a collet 12 into and from a collet chuck 14 of a lathe-type machine (not shown). In addition, the collet chuck includes interior compression surfaces 16.

The collet 12 includes a tool engagement end portion 18 and a threaded end portion 20. The collet 12 is circular in cross-section and generally has a plurality of fingers 22, located at the engagement end portion 18 of the collet 12, which are separated by slots 24. The collet 12, as illustrated in FIG. 1, has three fingers 22 and three slots 24. However, the collet 12 can also have four fingers and four slots 24, depending on the collet 12 being used.

The fingers 22 of the collet 12 define a cylindrical work engaging surface 26. The collet 12 further includes collet threads 28, extending circumferentially about the threaded end portion 20 of the collet 12, and an exterior surface 30. In addition, the exterior surface 30 of the collet 12 is beveled to accommodate the interior compression surfaces 16 of the collet chuck 14.

Figure 2:
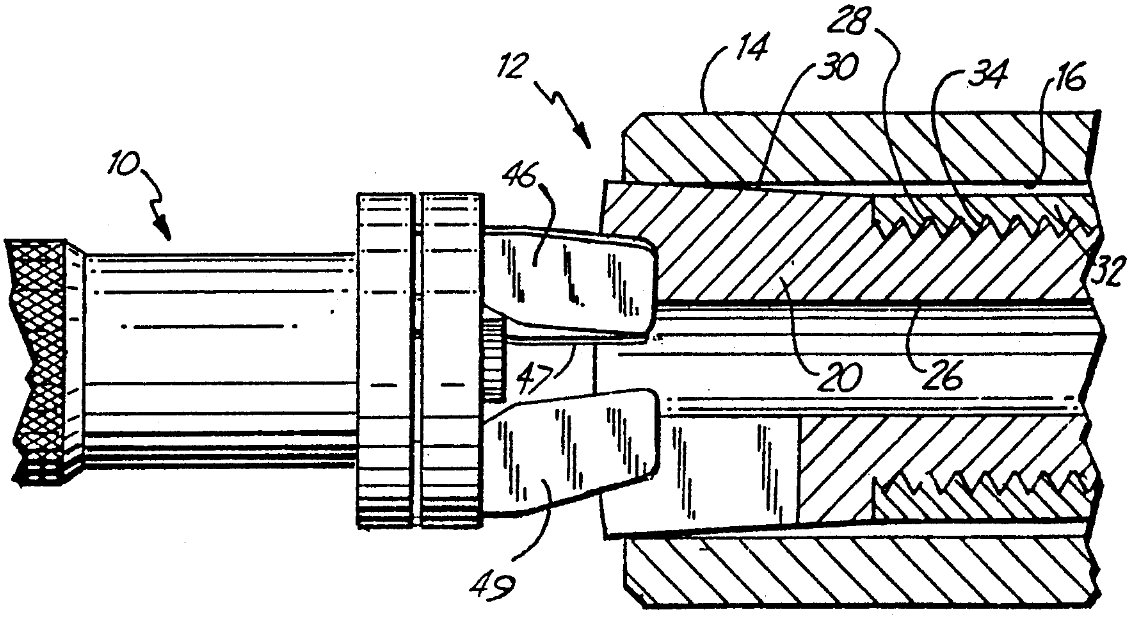
FIG. 2 is a sectional view taken along the line 2—2 in FIG. 1.

As illustrated in FIG. 2, a draw bar 32 is located within the collet chuck 14. The draw bar 32 includes draw bar threads 34 which are adapted to engage the collet threads 28 of the collet 12.

Upon insertion of a work piece (not shown) into the collet 12, the draw bar 32 is pulled inward such that the beveled exterior surface 30 of the collet 12 is pressed against the interior compression surfaces 16 of the collet chuck 14. In turn the cylindrical work engaging surface 26 of the collet 12 presses against the work piece and firmly holds the work piece in place.

The tool 10 of the present invention includes a handle portion 36. The handle portion 36 preferably includes a cylindrical portion 38 having a first end portion 40 and a second end portion 42. The first end portion 40 includes a knurled surface 44 that allows the user to grasp and easily manipulate the tool 10. The knurled surface 44 preferably extends circumferentially about the first end portion 40 in such a manner as to allow the user to grasp and hold any part of the first end portion 40 in order to turn the tool 10. Although a knurled surface 44 is illustrated, any type of gripping surface may be used on the first end portion 40 such as surfaces including ridges, ribbing, raised bumps, or the like.

Figure 3:
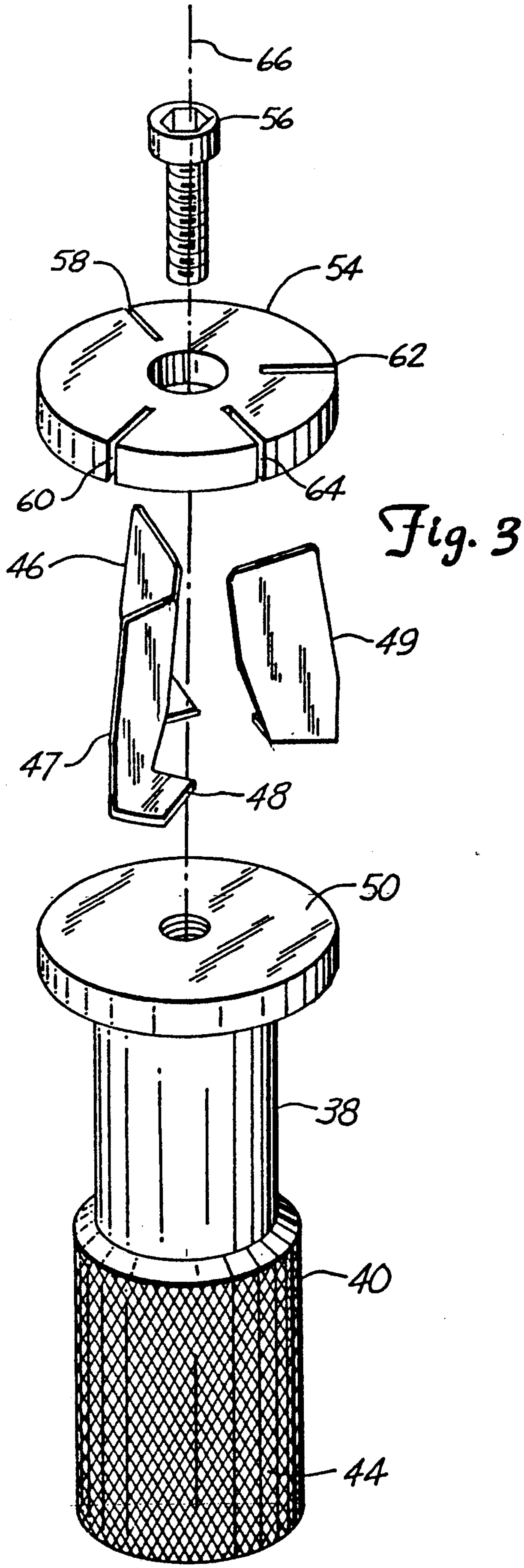
FIG. 3 is an exploded perspective view of the collet insertion and removal device of the present invention.

The tool 10 further includes a plurality of blades 46, 47 and 49 disposed on a top portion 50 of the second end portion 42 of the handle portion 26. As illustrated in FIG. 3, the blades 46, 47 and 49 are preferably bent and include tab portions 48. The tab portions 48 preferably rest against the top portion 50 of the second end portion 42.

The blades 46, 47 and 49 extend outward away from the second end portion 42 in order to engage the slots 24. Preferably, the blades 46 angle substantially inward towards a longitudinal center 66 of the handle portion 36 as illustrated in FIG. 3. The angle of the blades 46 allows the tool 10 to be used with any size collet, thus eliminating the need for a multiplicity of tools 10.

The second end portion 42 includes a holding mechanism 52 for securing the blades 46, 47 and 49 to the handle portion 36. The holding mechanism includes a holding plate 54 and bolt 56 that secures the holding plate 54 to the handle portion 36. The holding plate includes a plurality of slots 58, 60, 62 and 64 as illustrated in FIG. 3. Holding plate slots 58, 60 and 62 are preferably equidistant from each other while holding plate slot 64 is preferably opposite and in the same plane as the holding plate slot 58. The blades 46, 47 and 49 are secured to the handle portion 26 by positioning the tab portions 48 between the holding plate 54 and the top surface 50 of the second end portion 42 with each blade 46, 47 and 49 extending through slots 58, 60 and 62.

If the collet 12 has three slots 24, the blades 46, 47 and 49 are preferably disposed within the holding plate slots 58, 60 and 62 and are securely held to the second end portion 42 when the holding plate 54 is attached to the second end portion 42. If the collet 12 has four slots 24, the blades 46 and 47 are preferably disposed within the holding plate slots 58 and 64 and are securely held to the second end portion 42 when the holding plate 54 is attached to the second end portion 42.

The plurality of blades 46, 47 and 49 disposed within second end portion 42 are adapted to engage the slots 24 of the collet 12. The blades 46, 47 and 49 are inserted or removed to achieve the correct number of blades 46, 47 and 49 to engage the configuration of the slots 24 of the collet 12.

Preferably, the blades 46, 47 and 49 have a width less than or equal to the width of each of the slots 24. In addition, each of the blades 46, 47 and 49 preferably has a thickness less than or equal to the thickness of each of the slots 24. Limiting the width and thickness of the blades 46, 47 and 49 allows the blades 46, 47 and 49 to be easily inserted and removed reducing the needed manipulation of the operator of the tool 10 to insert blades 46, 47 and 49 within the slots 24. However, the minimum thickness of the blades 46, 47 and 49 must be of such thickness that the blades 46, 47 and 49 will possess the strength to withstand the torque of turning the collet 12 while inserting and removing the collet 12 from the collet chuck 14.

To insert the collet 12 into the collet chuck 14 of the lathe using the method and tool 10 of the present invention, the operator grabs the knurled surface 44 of the handle portion 36 and inserts the blades 46, 47 and 49 into the slots 24 within the desired collet 12. The collet 12 is placed inside the collet chuck 14 such that the collet threads 28 are positioned to engage the draw bar threads 32. The tool 10 is then turned such that the collet threads 28 of the collet 12 engage the draw bar threads 34 of the draw bar 32. The tool 10 is turned until the collet 12 is secured on the draw bar 32. Then, the blades 46, 47 and 49 are removed from the slots 24 of the collet 14.

To remove the collet 12 from the collet chuck 14 using the method and tool of the present invention, the operator grabs the knurled surface of the handle portion 36 and inserts the blades 46, 47 and 49 into the slots 24 within the collet 12. The tool !0 is then turned until the collet threads 28 of the collet 12 are disengaged from the draw bar threads 34 of the draw bar 32. The blades 46, 47 and 49 are then removed from the slots 24 of the collet 12 and the collet 12 is removed from the collet chuck 14

Although the present invention has been described with reference to preferred embodiments, workers skilled in the art will recognize that changes may be made in form and detail without departing from the spirit and scope of the invention.

What is claimed is:

1. A device for inserting and removing a collet into and from a collet chuck of a lathe, the collet having an exterior surface and including a plurality of fingers separated by collet slots, the fingers defining a cylindrical work engaging surface, the fingers being compressed by an interior compression surface of the collet chuck, the device comprising:

a handle portion;

a plurality of blades shaped to engage the collet slots within the collet; and a plate member having a plurality of plate member sots, the blades engaging the plate member slots and the plate member detachably attaching the blades to the handle portion such that the blades are positionable in more than one configuration for engaging the collet slots within the collet.

2. The device of claim 1 wherein the handle portion comprises a cylindrical portion, the cylindrical portion having a first end portion and a second end portion.

3. The device of claim 2 wherein the first end portion includes a knurled surface.

4. The device of claim 1 wherein each of the blades has a width less than or equal to the width of each of the colet slots.

5. The device of claim 1 wherein each of the blades has a thickness less than or equal to the thickness of each of the collet slots.

6. The device of claim 2 wherein the blades are disposed in the second end portion of the handle portion.

7. A method of inserting a collet into a lathe collet chuck, the collet including a plurality of fingers separated by slots, using a collet wrench device having a handle portion and a plurality of blades attached to the handle portion, the blades shaped and arranged to engage the slots within the collet, the method comprising:

inserting the blades into the slots within the collet;

positioning the collet to be secured within the lathe collet chuck;

turning the collet wrench device until the collet is secured within the lathe collet chuck; and removing the blades from the slots of the collet.

8. A method of removing a collet from a lathe collet chuck, the collet including a plurality of fingers separated by slots, using a collet wrench device having a handle portion and a plurality of blades attached to the handle portion, the blades shaped and arranged to engage the slots within the collet, the method comprising:

inserting the blades into the slots within the collet;

turning the collet wrench device until the collet is disengaged from the lathe collet chuck; and removing the blades from the slots of the collet.

* * * * *